(No Model.)
I. T. GRAHAM.
CORN HARVESTER.
No. 451,378. Patented Apr. 28, 1891.
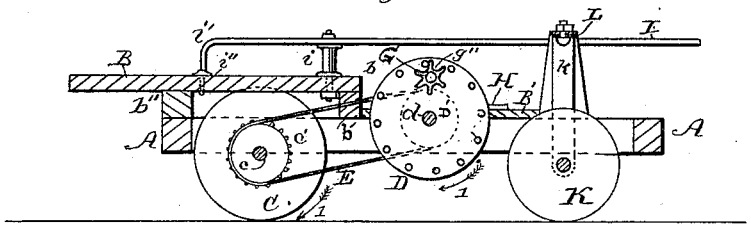
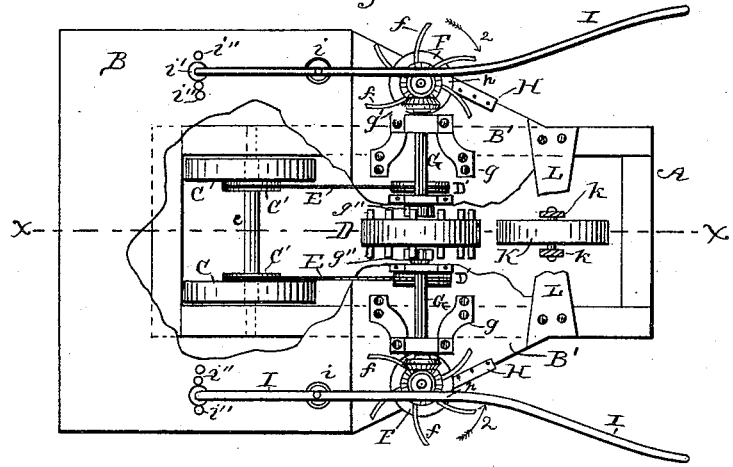
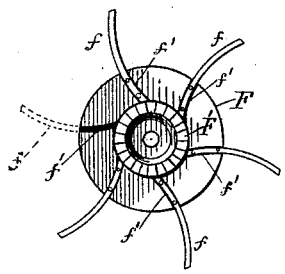
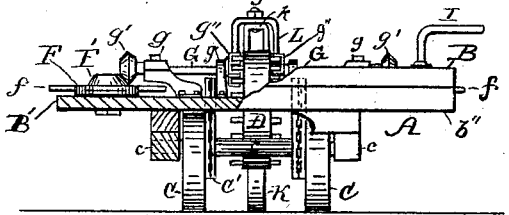
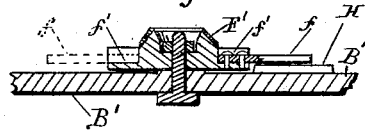
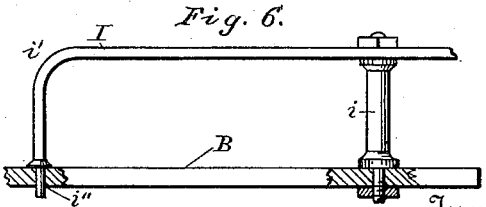
Witnesses.
Joseph Small
Elihu Wilbers
Inventor
Isaac T Graham
Wm R Singleton
Attorney

UNITED STATES PATENT OFFICE.

ISAAC THOMAS GRAHAM, OF EDGAR, NEBRASKA.

CORN-HARVESTER.

SPECIFICATION forming part of Letters Patent No. 451,378, dated April 28, 1891.

Application filed September 18, 1890. Serial No. 365,441. (No model.)

*To all whom it may concern:*

Be it known that I, ISAAC THOMAS GRAHAM, a citizen of the United States, residing at Edgar, in the county of Clay and State of Nebraska, have invented certain new and useful Improvements in Corn-Harvesters; and I do hereby declare the following to be a full, clear, and exact description of the invention, such as will enable others skilled in the art to which it appertains to make and use the same.

This invention relates to certain improvements in corn-harvesters, which will be hereinafter more particularly described and pointed out.

In the accompanying drawings, forming a part of this specification, Figure 1 is a longitudinal vertical section on line $x\,x$ of Fig. 2. Fig. 2 is a top or plan view of the machine with a part of the platform broken away to show the gearing. Fig. 3 is an end view from the rear of Fig. 2, partly in section, to show the gearing for operating the rotary knife-wheel. Figs. 4, 5, and 6 are details of detached parts enlarged.

A is a frame, which in the present case is made of wood and of sufficient strength to sustain all the parts of the machine without being too heavy for one animal. The frame can be made of iron, either cast or wrought, of such dimensions as to insure proper strength with lightness. On this frame is secured a platform or floor B, preferably of boards.

At $b$ there is a drop in the floor of several inches, the front part B′ being lower than the rear part B, which is supported on rails $b'\,b''$, extending across from one side to the other.

C C are the main driving-wheels, fixed to a shaft $c$, which is journaled to the side rails of the frame A. On the inside of each wheel C is a sprocket-wheel C′.

D is a central wheel having cogs on each side of it near its periphery. On each side of wheel D and on the same shaft $d$ is a sprocket-wheel D′, exactly in line with the sprocket-wheels C′, with which they are connected by chains E E. On top of the platform B′ on each side is a knife-wheel F, having a series of curved knives $f$, which are bedded into the face of the wheels in grooves $f'$, as shown in Figs. 4 and 5. The sharp edges of the blades extend several inches beyond the periphery of the wheels F. On top of each wheel F is a cogged wheel F′, having the cogs on the top faces of the wheels. These wheels are properly journaled on the platform.

G G are two short shafts journaled at $g\,g$ on the platform B′ axially in line with the axes of the two knife-wheels F. At the outer end of each of said shafts G is a cogged wheel $g'$, which meshes with the cogs of the wheels F′ below them, and on the inner end of each of the shafts G is a cogged wheel $g''$, which meshes with the cogs on wheel D. By this method of gearing it will be observed that when the frame is drawn forward the driving-wheels C C will revolve in the direction of the arrow 1, and by the chains E and sprocket-wheels D′ the shaft $d$ and wheel D will be rotated and revolve the cogged wheels $g''\,g''$, and the shafts G G and wheels $g'\,g'$ will then revolve the knife-wheels F in the direction of the arrows No. 2 from outside to inside.

The outer edges of the platform B′ are beveled, as shown in Fig. 2. Along this beveled edge is secured a flat knife-blade H even with the top of the platform, and the edges of the curved knives $f$ are a very little above the edge of the knife-blade H.

I I represent guide-rods, one on each side, which are swiveled on a standard $i$ on the platform B, and they project in front beyond the bevel of platform B′ and spread outwardly from the point where they cross the beveled edge of the flat knife H at $h$. From $i$ to $i'$ these rods are ordinarily parallel with the center line of the frame. The ends of these rods are bent downward at $i'$ and the ends are inserted in suitable holes $i''$ whenever it may be necessary to spread open or contract them for the purpose of adapting them to the varying widths of the ridges. The object of this arrangement is to bring the rows of standing corn exactly to the point where the revolving knives will cross the shear cut of the straight knife. As it is well known that in consequence of high winds the corn in most fields is twisted about in such a manner that there is great irregularity in the position of the stalks in the rows, therefore the flaring ends of the guide-rods will bring the wide rows inwardly, while the frame A and the beveled edge of the platform B' will spread outwardly the narrow rows, and in each case the stock will be guided to the exact place for cutting. The guide-rods I, being several inches above the cutting-edges of the knives, will force the upper part cut off to fall upon the platform.

K is a guide-wheel sustained in a yoke $k$, which is swiveled at the top in a frame L, which is properly supported on the side rails of the frame A.

I claim—

The combination of the driving-wheels C, having sprocket-wheels C', the chains E, sprocket-wheels D', shaft $d$, center wheel D, wheels $g''$ $g'$, and shafts G G, wheels F' and knife-wheels F, with series of knives, and straight beveled knives H H, and the guide-rods I I, which are curved outwardly at the forward ends and downwardly at the rear ends and adjustable in the holes $i''$, substantially as and for the purpose described.

In testimony whereof I affix my signature in presence of two witnesses.

ISAAC THOMAS GRAHAM.

Witnesses:
JOSEPH SMALL,
THOS. H. YOUNG.